United States Patent [19]

Sadan

[11] 4,179,493
[45] Dec. 18, 1979

[54] DEHYDRATION PROCESS

[76] Inventor: Abraham Sadan, 1618 E. St. Charles Pl., Salt Lake City, Utah 84121

[21] Appl. No.: 880,868

[22] Filed: Feb. 24, 1978

[30] Foreign Application Priority Data

Mar. 18, 1977 [IL] Israel ......................................... 51692

[51] Int. Cl.$^2$ ......................... B01D 1/00; C01B 15/12; C01D 15/06; C01D 17/00
[52] U.S. Cl. ..................................... 423/279; 423/421; 423/553; 423/554; 423/659; 159/1 S; 23/295 S; 23/302 T; 23/304
[58] Field of Search .................. 23/295 S, 298, 302 T, 23/304; 159/15; 203/DIG. 1; 423/179, 198, 192, 208, 421, 553, 554, 659, 279

[56] References Cited
U.S. PATENT DOCUMENTS 2,592,139  4/1952  Hegan .................................. 423/553

OTHER PUBLICATIONS

Weinberger, H. "The Physics of the Solar Pond" Solar Energy vol. VIII, #2 1964 pp. 45-56.

*Primary Examiner*—O. R. Vertiz
*Assistant Examiner*—Gary P. Straub
*Attorney, Agent, or Firm*—Robert J. Koch

[57] ABSTRACT

Disclosed is a process for the production of partially dehydrated or anhydrous salts from higher hydrates of the same salt, utilizing solar energy. Hydrated salts which have an increasing solubility with an increase of temperature, possessing a transition temperature from the existing high hydrated form to the desired one in the range of between about 30° C. to about 100° C. are partially or completely dehydrated in a solar pond having a non-convecting characteristic. Examples of salts produced according to the present invention are: anhydrous sodium sulfate from sodium sulfate decahydrate, magnesium sulfate monohydrate from magnesium sulfate heptahydrate, sodium carbonate monohydrate from sodium carbonate decahydrate and sodium borate pentahydrate from sodium borate decahydrate.

6 Claims, No Drawings

DEHYDRATION PROCESS

The present invention relates to a novel process for the production of certain dehydrated or anhydrous salts from higher hydrates of the same salt. More particularly, the present invention relates to a process utilizing solar energy for the dehydration or partial dehydration of certain hydrated salts by means of solar ponds.

According to a preferred embodiment of the invention, there is provided a process for the dehydration of Mirabilite, $Na_2SO_4.10H_2O$ to Tenardite which is anhydrous sodium sulfate. In more general terms the novel process according to the present invention is applicable to any hydrated salt which loses part of its water of crystallization to yield a hydrate having a lower water content, or to yield an anhydrous form, which is characterized in that the conversion temperature is in the range of about 30° to 100° C. and preferably between 30° and 80° C.

Other salts which can be dehydrated or partially dehydrated and transformed in their anhydrous or lower hydration form by means of the process according to the present invention are, for example, Epsomite ($MgSO_4.10H_2O$) to Kieserite ($MgSO_4.H_2O$) above the transition temperature of about 67.5° C., the conversion of Natron ($Na_2CO_3.10H_2O$) to sodium carbonate monohydrate ($Na_2CO_3.H_2O$) at a transition temperature of about 40° C., the conversion of sodium borate decahydrate ($Na_2B_4O_7.10H_2O$) to sodium borate pentahydrate ($Na_2B_4O_7.5H_2O$) above the transition temperature of 62° C. It is one of the requirements of the process according to the present invention that such compounds have to be used which possess a solubility which increases with an increase of temperature, thus making possible to establish a non-convecting solar pond.

BACKGROUND OF THE INVENTION

"The Physics of the Solar Pond" was described in some detail by Hershel Weinberger of the National Physical Laboratory of Israel in Solar Energy, Vol. VIII, No. 2, 1964, pages 45-56. According to this article, it has been found that solar radiation can effect a considerable temperature rise in non-convecting ponds of about a meter depth. Salt water at temperatures near 100° C. can be withdrawn for utilization from the bottom of the ponds. The efficiency of the pond as a collector of solar energy is then greater than 20 percent and 4 percent of the incident energy can be converted by a Carnot engine to electrical energy. The pond is maintained non-convecting when there is a temperature gradient in the pond, with the bottom warmer then the top, by means of a salt concentration gradient that assures the greater density at the lower regions.

In many places of the world there exist extensive deposits of sodium sulfate. The deposits mainly consist of Mirabilite, or Glauber's salt, which is sodium sulfate, combined with 10 molecules of water. These 10 molecules of crystal-bound water account for 55.9% of the weight of the crystal and, therefore, it is very advantageous to remove the water prior to shipment. The crystals are monoclinic, white, transparent to opaque, and occur readily in nature. Tenardite, or anhydrous sodium sulfate, is defined as $Na_2SO_4$ and is found sparsely in nature. It forms orthorombic and twin crystals. The transition temperature between the salts having a water content of 10 molecules and anhydrous form is about 32° C.

One of the main consideration in order to purify and dehydrate the Glauber's salt to obtain the anhydrous sulfate (Tenardite), is the cost of energy required to remove the water present therein. The refining and dehydration of the salt in various commercial plants is based amongst others on the following equipment: rotary dryers, drum dryers, submerged combustion evaporators, multiple effect evaporators, flash dryers, tray dryers, fluidized bed dryers etc. These are relatively expensive and energy consuming equipment.

SUMMARY OF THE INVENTION

According to the present invention there is provided a novel process for the partial or complete dehydration of various hydrates, at their transition point, by means of a non-convecting solar pond.

The invention is illustrated with reference to sodium sulfate, but it ought to be clearly understood that it is applicable to any other salt which has a solubility increasing with an increase of temperature and provided that it possesses a transition temperature between the higher hydrates and the lower desired hydrate or the anhydrous form, in the range of between 30°-100° C., and preferably 30°-80° C.

Attempts made hitherto to convert Mirabilite to Tenardite by solar heating have not been successful since temperatures of about 32° C. and above, could not be achieved for a sufficiently prolonged period of time to assure a high quality product. Generally there was obtained a layer or slad comprising a mixture of both Tenardite and Mirabilite and the harvesting of the desired product was difficult, the quality concerning its purity being generally unsatisfactory. As pointed out above, it is easily possible to obtain by means of solar ponds quite high temperatures, even up to about 100° C. The solar pond is maintained non-convective when there is an established temperature gradient in the pond, with the bottom warmer than the top, and the salt concentration gradient being maintained so as to assure a greater density at the lower regions of the pond than at the upper regions of same.

Experiments carried out according to the present invention have shown that it is easily possible to establish a solar pond having a depth of about 1 meter, if maintained in a non-convecting condition, with brine solutions having a density gradient from about 1.12 at the top and 1.27 at the bottom, with temperatures in the range from 20° C. at the top and up to about 75° C. at the bottom of the pond.

When such a solar pond is established from a solution of Glauber's salt (Mirabilite) evaporation takes place at the upper layer. When the solubility of Mirabilite is exceeded, it crystallizes out and, due to its density of about 1.46 g/cc, it starts to sink to the bottom of the pond, where the temperature is well above the transition temperature of 32° C. Upon reaching the region where the temperature exceeds the transition temperature, the Mirabilite is converted to anhydrous sodium sulfate and there is obtained a sodium sulfate of a concentration of about 30% by weight.

Basically, various modifications in the process according to the present invention can be used, such as:

(a) Mirabilite can be dissolved in water and the solution obtained fed to a solar pond wherein by solar evaporation, mainly at the upper layer of the pond, Mirabilite crystallizes out and sinks to the bottom of the pond where temperatures are well above the transition temperature and thus the anhydrous sodium sulfate is obtained in essentially pure crystalline form, and (b) Mirabilite can be introduced into a solar pond together with sodium sulfate solution, and establishing a solar pond with a non-convecting character. As the temperatures are exceeding the transition temperature of Mirabilite, there is obtained a conversion of this form to anhydrous sodium sulfate which is obtained in an essentially pure form.

The process can be effected either in a batch-wise procedure or in a continuous manner. In a similar manner the same procedure can be used for the following cases: to convert Epsomite to Kieserite, to convert Natron to the corresponding sodium carbonate monohydrate, to convert sodium borate decahydrate to sodium borate pentahydrate, and to convert any other suitable hydrated salt to a corresponding salt having a lower degree of hydration or to an anhydrous form provided that a transition temperature in the range of about 30° C. to 100° C. exists.

The efficiency of utilization of solar energy by means of solar ponds is a very high one, and under conditions of suitable climate, the process according to the present invention has considerable economic advantages compared with any other form of conversion which generally requires quite expensive sources of energy for such conversion and dehydration.

It is clear that the above description is by way of example only and that one can resort to many changes and modifications of the process described without departing from the spirit and scope of the present invention.

A non-convecting solar pond was simulated in the laboratory by a well insulated pan of 1 meter by 2 meters and 1 meter depth. On the bottom of the pan a heater was mounted, capable of elevating the temperature at the bottom of the pan to 100° C. and to establish a controlled temperature gradient. On the top of the pan an arrangement was provided, capable of blowing air to cause evaporation and cooling of the upper layer of brine at the top of the pan, level controls of brine in the pan were also provided. In Example 3 the invention is illustrated by an experiment carried out in a non-convecting solar pond.

EXAMPLE 1

A saturated solution of sodium sulfate of 32% (by wt) was fed to a pan and the heater was turned on to bring the temperature of the solution to about 90° C., at the same time air was blown at the surface of the pan to cause evaporation. Sodium sulfate solution was allowed to flow continuously to the pan in such a manner as to keep a constant level in the pan.

After two days samples were taken out from the bottom of the pan and their analysis showed that the salt consisted of pure anhydrous $Na_2SO_4$.

EXAMPLE 2

The same pan as utilized in Example 1 was filled with a 20 cm. level of Mirabilite ($Na_2SO_4.10H_2O$) and was filled up with saturated solution of sodium sulfate (32% by wt). The procedure was the same as in Example 1, level and temperature at the bottom being controlled.

After two days a sample at the bottom of the pan was taken out; by analysis it was found that a full conversion of the Mirabilite to anhydrous sodium sulfate took place.

EXAMPLE 3

In a non-convecting solar pond 25×25 m. and depth of 1.5 m., an aqueous feed solution of 32% by wt sodium sulfate was introduced. At the top of the solar pond a temperature range of 15°–25° C. was noticed, while inside the pond the temperature was between 45° to 50° C.

After two days, samples were taken out from the bottom of the pond and from their analysis it was found that about 95% of the product consisted of anhydrous sodium sulfate.

What is claimed is:

1. A process for the partial or complete dehydration of hydrated forms of salts having an increasing solubility with an increase of temperature, and possessing a transition temperature from an existing highly hydrated form to a less hydrated form in the range of between about 30° C. to about 100° C., comprising the steps of:
    (a) preparing an aqueous solution of said highly hydrated form of salts;
    (b) introducing said aqueous solution into a solar pond which is maintained non-convecting by means of a salt concentration gradient;
    (c) concentrating said aqueous solution in an upper layer of the pond to form crystals of said highly hydrated form of the salt;
    (d) allowing said formed crystals of the hydrated form of the salt to settle to a hotter bottom layer of the pond and to recrystallize into a partially or completely dehydrated form of the salt; and
    (e) recovering the partially or completely dehydrated form of the salt from the bottom layer of the pond.

2. A process according to claim 1 wherein the salts have a transition temperature between the range of about 30° to about 80° C.

3. A process according to claim 1 wherein the starting material is Glauber's salt and the product is anhydrous sodium sulfate, the transition temperature being about 32° C.

4. A process according to claim 1, wherein the starting material is magnesium sulfate heptahydrate and the product is magnesium sulfate monohydrate, the transition temperature being about 67.5° C.

5. A process according to claim 1, wherein the starting material is sodium carbonate decahydrate and the product is sodium carbonate monohydrate, the transition temperature being about 40° C.

6. A process according to claim 1, wherein the starting material is sodium borate decahydrate and the product is sodium borate pentahydrate, the transition temperature being about 62° C.

* * * * *